United States Patent [19]
Leighley

[11] Patent Number: 6,056,162
[45] Date of Patent: May 2, 2000

[54] SELF-CONTAINED SERVICE TOOL FOR ADDING FLUORESCENT LEAK DETECTION DYE INTO SYSTEMS OPERATING WITH PRESSURIZED FLUIDS

[75] Inventor: Kenneth C. Leighley, Stony Brook, N.Y.

[73] Assignee: Spectronics Corporation, Westbury, N.Y.

[21] Appl. No.: 09/181,195

[22] Filed: Oct. 28, 1998

Related U.S. Application Data

[60] Provisional application No. 60/063,864, Oct. 31, 1997.

[51] Int. Cl.[7] .............................. B67D 5/38; B67D 5/42; B65D 88/54
[52] U.S. Cl. ........................... 222/156; 222/309; 222/390
[58] Field of Search .................... 222/309, 390, 222/386, 156, 154

[56] References Cited

U.S. PATENT DOCUMENTS

| | | | |
|---|---|---|---|
| Re. 26,180 | 4/1967 | Frenzel et al. .............................. 222/39 |
| 398,904 | 3/1889 | Sage . |
| 1,338,743 | 5/1920 | Lyman . |
| 1,668,196 | 5/1928 | Fageol . |
| 1,691,861 | 11/1928 | Stout . |
| 1,729,959 | 10/1929 | Murphy . |
| 2,107,242 | 2/1938 | Gates ........................................ 221/79 |
| 2,118,367 | 5/1938 | Tear ....................................... 221/47.4 |
| 2,128,382 | 8/1938 | Tear ....................................... 221/47.3 |
| 2,284,533 | 5/1942 | Neuman ................................ 221/47.3 |
| 2,317,872 | 4/1943 | Zimt ....................................... 221/47.4 |
| 2,431,156 | 11/1947 | Wonders ................................ 120/36 |
| 2,706,398 | 4/1955 | Davidson ................................ 73/40 |
| 2,981,091 | 4/1961 | Roberts ..................................... 73/1 |
| 3,101,711 | 8/1963 | Reitknecht ............................ 128/218 |
| 3,124,841 | 3/1964 | Kaji ........................................... 18/30 |
| 3,353,718 | 11/1967 | McLay .................................. 222/158 |
| 3,406,017 | 10/1968 | Canning .................................. 23/232 |
| 3,481,510 | 12/1969 | Allen, Jr. ................................ 222/79 |
| 3,645,127 | 2/1972 | Mongodin et al. ..................... 73/40.7 |
| 3,721,117 | 3/1973 | Ford et al. .............................. 73/40.7 |
| 3,742,988 | 7/1973 | Kush ........................................ 141/2 |
| 3,774,816 | 11/1973 | Bratton .................................. 222/391 |
| 4,260,076 | 4/1981 | Bergman ................................ 222/46 |
| 4,269,331 | 5/1981 | Watson .................................. 222/390 |
| 4,367,739 | 1/1983 | LeVeen et al. ......................... 128/236 |
| 4,456,823 | 6/1984 | McFarland et al. ................. 250/252.1 |
| 4,658,993 | 4/1987 | Vlasich .................................. 222/390 |
| 4,709,576 | 12/1987 | Raabe ................................... 73/40.5 R |
| 4,810,249 | 3/1989 | Haber et al. ............................ 604/210 |

(List continued on next page.)

FOREIGN PATENT DOCUMENTS

| | | |
|---|---|---|
| 27 41 185 | 2/1979 | Germany . |
| 120310 | 11/1959 | Russian Federation . |
| 0669246 | 6/1979 | Russian Federation . |
| 754210 | 8/1980 | Russian Federation . |
| 317650 | 8/1929 | United Kingdom . |

Primary Examiner—Andres Kashnikow
Assistant Examiner—Jorge Bocanegra
Attorney, Agent, or Firm—Seidel, Gonda, Lavorgna & Monaco, PC

[57] ABSTRACT

A dispensing device is provided for introducing a fluorescent leak detection dye into an operating system containing a pressurized fluid. An embodiment of the dispensing device of the invention comprises a hollow capsule for containing dye having an interior wall and a first and a second end, with the first end adapted to engage the operating system. A plunger having a geometry corresponding to the capsule's interior wall forms a seal against the wall. A rod, having threads of a pre-selected pitch and at least one channel running longitudinally on the rod, is rotatably and axially moveable within the capsule. An end cap is adapted to receive the second end of the capsule with the rod positioned through the end cap. The dispensing device has means located in the end cap to provide controlled engagement of the rod, interposed with the threads of the rod. An indicator adapted to engage the channel of the rod is located in the end cap. A knob is attached to the rod so that rotation of the knob directs the movement of the rod through the capsule and an audible and tactile response is generated as the indicator engages the channel.

6 Claims, 1 Drawing Sheet

U.S. PATENT DOCUMENTS

| | | | |
|---|---|---|---|
| 4,865,229 | 9/1989 | Schneider et al. | 222/325 |
| 4,898,021 | 2/1990 | Weaver et al. | 73/40.7 |
| 4,938,063 | 7/1990 | Leighley | 73/40.7 |
| 5,071,040 | 12/1991 | Laptewicz, Jr. | 222/235 |
| 5,076,473 | 12/1991 | Steiner | 222/327 |
| 5,167,140 | 12/1992 | Cooper et al. | 73/40.7 |
| 5,261,269 | 11/1993 | Barker | 73/40.7 |
| 5,279,585 | 1/1994 | Balkwill | 222/309 |
| 5,279,586 | 1/1994 | Balkwill | 222/309 |
| 5,353,962 | 10/1994 | Scholz et al. | 222/95 |
| 5,551,603 | 9/1996 | Woodruff | 222/325 |
| 5,556,009 | 9/1996 | Motzko | 222/326 |
| 5,603,701 | 2/1997 | Fischer | 604/211 |
| 5,650,563 | 7/1997 | Cooper et al. | 73/40.7 |
| 5,665,903 | 9/1997 | Moran | 73/49.5 |

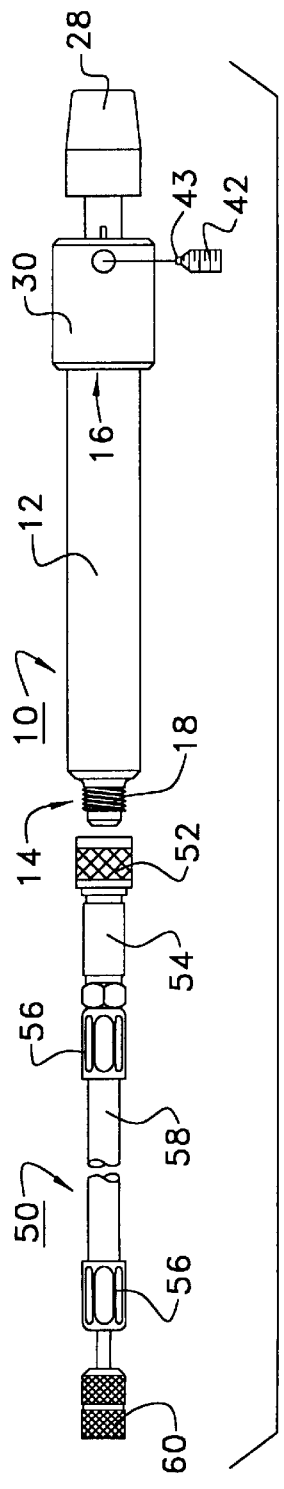
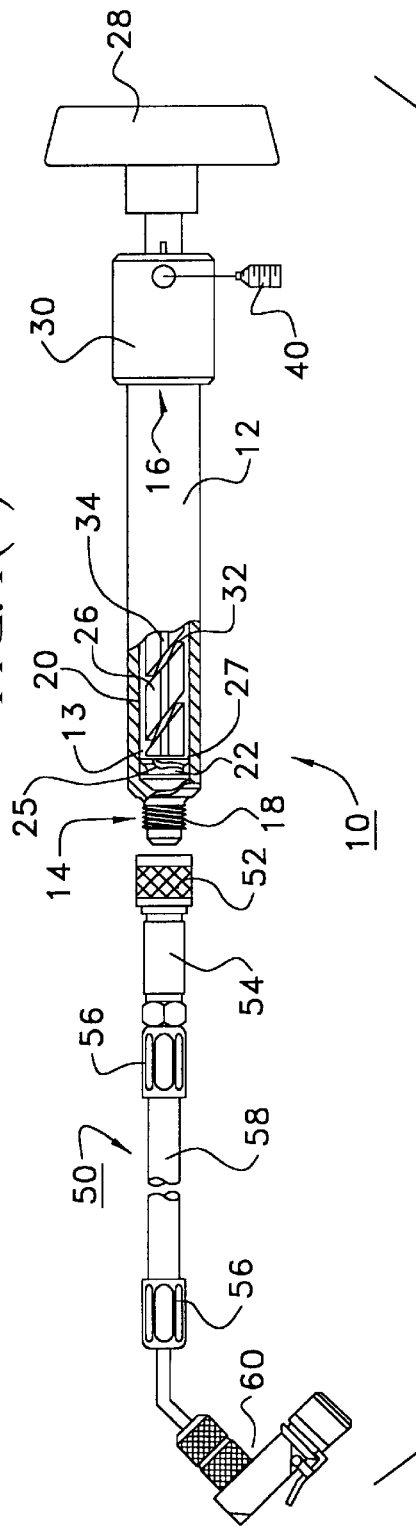
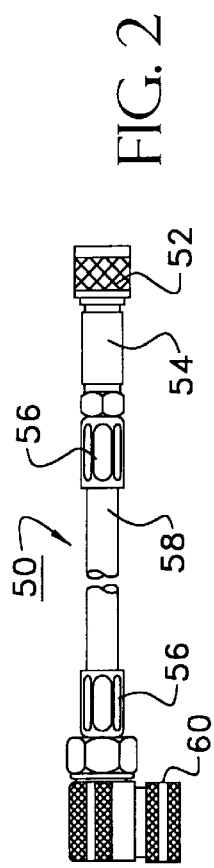
FIG. 1(a)
FIG. 1(b)
FIG. 2

SELF-CONTAINED SERVICE TOOL FOR ADDING FLUORESCENT LEAK DETECTION DYE INTO SYSTEMS OPERATING WITH PRESSURIZED FLUIDS

This application claims priority to U.S. provisional patent application no. 60/063,864 filed on Oct. 31, 1997.

FIELD OF THE INVENTION

The present invention relates generally to the field of ultraviolet leak detection, and in particular, to the field of devices that are used to deliver fluorescent dyes to an operating fluid.

BACKGROUND OF THE INVENTION

Ultraviolet leak detection provides an ideal means of determining the exact source of the leakage of a working fluid within an operating system. The operating fluid (e.g., lubricants, hydraulic fluids, heat transfer fluids, refrigerants, etc.) is treated with a small proportion of a fluorescent dye which will enable the operating fluid to fluoresce, even under operating conditions. Any leakage of this treated fluid from the system within which it is operating can be pinpointed by illuminating the exterior of the fluid-containing components with ultraviolet light. These leak sites will then fluoresce brilliantly, facilitating leak detection.

This technology is especially suited to applications within fields which require the use of pressurized working fluids, such as air conditioning and refrigeration, hydraulics, and compressed gaseous fuels. Any system within which a pressurized fluid flows, and in which the fluid may carry a fluorescent dye, is a candidate for this leak detection technology. Leakage in lines and circuits carrying these types of fluids has been notoriously difficult to reliably detect. However, the superior effectiveness of ultraviolet leak detection allows for pressurized fluid leaks to be located quickly and easily. Accurate ultraviolet leak detection enables operators to keep equipment in an efficient operating condition, conserving power and fluids while providing the maximum effects required for the equipments' application.

A variety of equipment designed to introduce a fluorescent leak detection dye into an operating system is currently available. The equipment can be broadly described as being of either the pre-filled disposable infuser capsule, refillable injector, or refillable displacement type injector varieties.

Both the refillable and pre-filled dye injection equipment operate similarly. Using a refrigeration system as an example, hollow chambers containing dye are connected to a service port on a system and then charged into the system using liquid refrigerant as a propellant. The injectors are basically self-cleaning since liquid refrigerant is flushed through the injector and into the system.

When using the refillable and the pre-filled dye injection equipment described above, care must be taken to avoid allowing the system to become overcharged with the delivered refrigerant. An overcharging of refrigerant can cause system damage from excess pressure or from flooding of the compressor. Decreased system efficiency, due to flooding of the evaporator, is also possible. Further, the use of the refrigerant to introduce the dye also necessitates a connection to heavy refrigerant cylinders or large, cumbersome refrigerant recovery devices.

Prior art refillable displacement-type dye injectors have addressed some of these problems. Such dye injectors allow for the fluorescent dye to be added into a refrigeration or air conditioning system without the need of connecting to any auxiliary source of refrigerant. This permits the user to add dye fluid without adding refrigerant and without the need of connecting to bulky service equipment. Such tools consist of a hollow chamber which is filled with a quantity of liquid dye. The dye is injected into a service fitting by the action of a plunger displacing the dye. This tool basically acts as a syringe, injecting dye into the refrigeration line. Though these devices are convenient because there is no need for refrigerant to act as a propellant, these devices do have a disadvantage in that they must be opened to be refilled.

Any device which incorporates a hollow chamber which must be accessed by a user presents difficulties. The chamber must be filled completely to avoid the possibility of injecting air into a system. The presence of air in a closed liquid system can negatively effect the system's mechanical components and operational performance. Opening the dye reservoir can expose it to contaminants, such as moisture, dust, dirt and particulate matter. Indeed, many of the dyes used for ultraviolet leak detection are very hydrophilic, readily absorbing moisture from the atmosphere. As a result, the purity of the dye used to fill the reservoir may be compromised by the dye having been stored improperly sealed.

Manually filling the tool can also be very messy, as dye material can be spilled or lost to overfilling. Any dye that drips on equipment or is transferred from a mechanic's hands to equipment could result in false leak indications. Any fluorescent traces on a system resulting from dye having dripped from service equipment or elsewhere could be interpreted as being located on actively leaking components, and result in further investigation or in costly repairs which are not necessary. Finally, the refillable displacement type dye injectors must be carefully purged of air before each application. Since no propellant fluid is used to force the dye into the system to be treated, simple purging of air by allowing a flow of propellant is not possible. Any air must be displaced by the dye material.

A currently available applicator utilizing pre-filled chambers of dye is a "caulking gun" style applicator. There are several disadvantages to employing this type of device. For one, the internal mechanism of such tools depends on friction between the moving parts to either advance or restrain the travel of the plunger assembly. This promotes wear on the parts and the tool becomes less effective over time. Because the tool is designed for use with oil-based dyes, small amounts of lubricant from a dye may contact the tool's moving components, resulting in less effective advancement or restraint of the plunger. Effective advancement and restraint of the plunger is absolutely essential for applications dependent upon carefully metered quantities of dye.

In fact, the "caulking gun" style applicator inherently lacks the ability to control the quantity of dye being charged into the targeted system. The lever of the device can be pulled back to any position, advancing the plunger a proportional distance (assuming no slippage). At the same time, the pivoting handle of these applicators only reaches its regulated limit of travel after it is fully retracted into the user's hand. The resulting hand position is uncomfortable and does not promote the efficient application of the necessary significant force to the pivoting handle. A different user may squeeze the handle back a different amount, depending on the size of his hand, his own strength, and the speed at which he performs the application.

If the handle is depressed only part of the way, there is no definitive way for a user to be aware of what part of the necessary dye charge entered the system. As such, the user may have to attempt to "top off" the system with additional dye, resulting in an overcharged system—or in an undercharged system if the user was not aware the dye charge was not completely introduced. In an attempt to mitigate these adverse consequences, "caulking gun" style applicators utilize a highly diluted dye. The use of diluted dyes increases the total quantity of material delivered to a system. The use of diluted dyes is not beneficial since operating systems depend heavily on the quality of the operating fluid. Changes in physical properties could result in system failure.

There is a need for a convenient tool which will allow neat and accurate introduction of fluorescent dyes into pressurized systems. Such a tool would overcome the disadvantages of presently available applicator tools detailed above. Such a tool would also provide a great benefit to service personnel who must maintain them and the owners of such equipment who must finance their operations.

SUMMARY OF THE INVENTION

A dispensing device is provided for introducing a fluorescent leak detection dye into an operating system containing a pressurized fluid. An embodiment of the dispensing device of the invention comprises a hollow capsule for containing dye having an interior wall and a first and a second end, with the first end adapted to engage the operating system. A plunger having a geometry corresponding to the capsule's interior wall forms a seal against the wall. A rod, having threads of a pre-selected pitch and at least one channel running longitudinally on the rod, is rotatably and axially moveable within the capsule. An end cap is adapted to receive the second end of the capsule with the rod positioned through the end cap. The dispensing device has means located in the end cap to provide controlled engagement of the rod, interposed with the threads of the rod. An indicator adapted to engage the channel of the rod is located in the end cap. A knob is attached to the rod so that rotation of the knob directs the movement of the rod through the capsule and an audible and tactile response is generated as the indicator engages the channel.

BRIEF DESCRIPTION OF THE DRAWINGS

FIG. 1 (*a*) is a schematic view of a preferred embodiment of the service tool of the present invention, particularly showing the top view of the invention.

FIG. 1 (*b*) is a partially sectionalized side view of the preferred embodiment of the present invention of Figure 1a.

FIG. 2 is a schematic view of an alternative delivery assembly for use with the service tool of the present invention.

DETAILED DESCRIPTION OF THE INVENTION

A device is provided which is constructed to connect a pre-filled, disposable dye reservoir to a plunger apparatus wherein the apparatus is designed to provide a mechanical advantage to overcome the target system's pressure and inject the dye material.

A self-contained service tool for adding fluorescent leak detection dye into a system operating with pressurized fluid is shown generally by the numeral 10 in FIGS. 1(*a*) and 1(*b*). The service tool 10 is designed to receive a capsule 12 containing a fluorescent dye fluid. The capsule 12 has an outlet end 14 and an inlet end 16. The outlet end 14 preferably is adapted to engage the operating system or a delivery adapter assembly that is in turn adapted to engage the operating system. Preferably, the outlet end 14 has a threaded male fitting 18 fashioned thereon.

The capsule 12 is generally of a cylindrical shape and is hollow forming a cavity 13. The dye to be delivered to the operating system is contained within the cavity 13. The capsule 12 has an interior wall 20 having generally cylindrical dimensions. The preferred wall thickness will depend, in part, upon the maximum operating pressure encountered when delivering the dye fluid to an operating system. Generally, the capsule walls should be able to withstand pressures ranging from about 400 psi to about 600 psi. It is anticipated that a capsule 12 containing dye would be commercially available such that the first end 14 is capped by a disposable plastic cap and the inlet end 16 is sealed by the presence of a rubber bushing or plunger 22 and another disposable plastic cap. The disposable plastic caps (not shown) are removed prior to insertion of the rod 26 in the service tool 10. The plunger 22 has a geometry corresponding to the interior wall 20 of the capsule 12, forming a seal against the interior wall 20. The plunger 22 perfects a sufficient seal so as to prevent the fluid dye material held in the capsule 12 from flowing through the inlet end 16 when the disposable cap on end 16 is removed.

The capsule 12 is preferably made of a plastic material and is most preferably translucent.

The cavity 13 is continuous for the length of the capsule 12. The diameter of the cavity 13 narrows in the area of the outlet end 14, but is otherwise substantially constant. In a most preferred embodiment, the length of the capsule 12 is in the range from about five inches to about six inches and the diameter of the capsule 12 is in the range of about one-half inch to about one inch. Whatever dimensions of the capsule 12 are chosen are dependent upon the amount of dye needed to be introduced to a system, the typical quantity to be delivered in a single metered dosage, ease of use, and the physical demands dictated by the target system's pressure.

The service tool 10 further comprises a rod 26 of sufficient dimension to move within the hollow capsule 12. A fastener 25 and washer 27 are preferably affixed to the rod at one end thereof. The fastener 25 may be a screw, for example.

The rod 26 is connected to a knob 28 at the end of the rod 26 opposite the end having the attached fastener 25. The rod 26 is further situated within a hollow end cap 30. The end cap 30 is cylindrical and is open at opposite ends. The end cap 30 is adapted to receive the inlet end 16 of the capsule 12. In a preferred embodiment, the inlet end 16 of the capsule 12 contains threads (not shown) to matingly engage the end cap 30. Alternatively, a snap-fit engagement is possible or similar means for joining the end cap 30 to the capsule 12. The rod 26 contains threads 32 of a preselected pitch. The rod 26 may also contain at least one longitudinal channel 34 extending from the plunger 22 and running substantially the length of the rod 26.

The end cap 30 contains a set screw 40. The set screw 40 is preferably brass tipped. The set screw 40 is positioned perpendicular to the longitudinal axis of the rod 26 within the end cap 30 such that the brass tip of the screw 40 is interposed in the threads 32 of the rod 26. The screw 40 therefore directs the axial movement of the rod 26 along the interior of the capsule 12 and maintains the positional relationship of the rod 26 within the capsule 12 and the end cap 30. The turning of the knob 28 allows the rod 26 to move in either direction along the path dictated by the longitudinal axis of the rod 26. Alternatively, the end cap 30 may contain threads in lieu of a set screw for engaging the threads of the rod 26 to effectuate positional control of the rod 26 in the capsule 12.

It is in this manner that the rotation of the rod 26 facilitates the delivery of a dye to a pressurized operating system. This is the preferred method for achieving the necessary mechanical advantage needed to overcome the operating system's pressure. The threads 32 of the rod 26 can be designed with sufficient preselected pitch to permit the displacement of the desired volume of dye into an operating system. Thus, a predetermined amount of rotation of the rod 26 (facilitated by rotating the knob 28) can accurately meter a "dose" of dye to the target system.

The end cap 30 may further contain a ball plunger 42. The commercially available ball plunger 42 is essentially a spring-loaded metal ball situated within a housing. The housing is threaded to permit the ball plunger 42 to be screwed into the end cap 30. The tip of the ball plunger 42 is a spring-loaded ball 43. The ball 43 moves up and down in response to the force against it. The ball plunger 42 is positioned in the end cap 30 perpendicular to the longitudinal axis of the rod 26. The tip of the ball plunger 42 is set against the rod 26 such that the ball 43 is in a retracted position until the ball plunger 42 engages the channel 34 and the ball 43 relaxes to full extension and becomes interposed in the channel 34. In this manner, the ball 43 would "snap" into channel 34 as the rod 26 is rotated. This provides both a tactile and an audible indication (or feedback) that a certain amount of dye was displaced from the tool 10.

The pre-filled capsule 12 is preferably disposable. As noted, the second end 16 of the capsule 12 contains a rubber plunger 22 tightly engaging the interior wall 20 of the capsule 12, forming an essentially air-tight and liquid-tight seal. As the rod 26 is driven down the length of the capsule 12, dye may be dispensed through the outlet end 14 of the capsule 12 with no leakage of dye back into the capsule 12 despite the operating system's pressure opposing the introduction of the dye. The contents of the capsule 12 can be applied without the need to purge air from the capsule 12 prior to application of the dye. The airtight, moisture-proof seal formed between the plunger 22 and the capsule wall 20 avoids contamination of the contents in the capsule 12.

Multiple applications may be possible from one capsule. Therefore, the necessity of reloading the apparatus after each application is avoided. The feedback function of the ball plunger 42 indicates when the proper amount of dye had been displaced and the service tool 10 is then disconnected for a future use. The seal maintained by the plunger 22 keeps the dye safely in the capsule 12, avoiding spills or contamination. In addition to the feedback function of the ball plunger 42, the exterior of the capsule 12 may be marked with graduations (not shown in the Figures) that provide an indicator for the amount of dye delivered, for example, per full rotation of the knob 28.

It is contemplated that any materials sufficient to fabricate a sturdy tool and be inert to the dye fluids retained in or passing through the tool, such as steel, brass, and like materials are sufficient building materials for all parts of the present invention. Plastics similarly capable of sturdy construction are also acceptable, such as injection-molded plastics, glass-filled nylons, high density polyethylene, polypropylene, and the like. Since the capsule is designed to be disposable, it is preferably made of a relatively inexpensive material. In the most preferred embodiment, however, the set screw 40 and the ball plunger 42 are fabricated from steel or like materials.

The service tool 10 may preferably be joined to a delivery assembly 50 to enable the dye to be dispensed to a pressurized operating system. FIGS. 1(a) and 1(b) illustrate a delivery assembly 50 referably used with R-12 refrigerant applications. FIG. 2 shows an alternative delivery assembly 50 for a R-134a refrigerant application that may be employed, for example, in an automotive application. The delivery assembly 50 comprises a female fitting 52 adapted to engage the male fitting 18 of the capsule 12. The delivery assembly further comprises a check valve fitting 54, crimped hose fasteners 56, and flexible hose 58. The check valve 54 allows the hose to remain charged (filled) when disconnected from the capsule 12. An adapter 60 is standardized for the particular application, such as for R-12 or R-134a refrigerant applications.

There are several mechanical advantages attributable to the present invention. The movement of the rod and plunger assembly necessary to deliver the dye to a pressurized system does not depend on friction between moving parts to advance or restrain the movement of the plunger assembly, such as that required by "caulking gun" style applications. Thus, the present invention would be expected to have a longer lifetime of effective use as the wear and tear on the mechanical parts of the present invention is inherently minimized. Further, the present invention permits definite control of the quantity of dye being charged into the targeted operating system. Because of the defined control a user has in delivering a known quantity of dye to a system, there is no need to utilize a diluted dye to compensate for the unintended introduction of additional dye fluid. Thus, the present invention is advantageous for use in systems sensitive to the composition of the dye introduced since accurate formulations of concentrated dye can be dispensed. This permits less dye material to be used to achieve an equivalent effect.

It is further understood that the present invention is not limited to the particular embodiments shown and described herein, but that various changes and modifications may be made without departing from the scope and spirit of the invention.

What is claimed is:

1. A dispensing device for introducing a fluorescent leak detection dye into an operating system containing a pressurized fluid, the device comprising:
   a. a hollow capsule for containing dye having an interior wall and a first and a second end, the first end adapted to engage the operating system;
   b. a plunger having a geometry corresponding to the interior wall of the capsule, forming a seal against the interior wall;
   c. a rod rotatably and axially moveable within the capsule;
   d. the rod having threads of a pre-selected pitch and at least one channel running longitudinally on the rod;
   e. a knob attached to the rod;
   f. an end cap adapted to receive the second end of the capsule, wherein the rod is positioned through the end cap;
   g. means to provide controlled engagement of the rod located in the end cap and interposed with the threads of the rod;
   h. an indicator located in the end cap adapted to engage the channel of the rod;
   i. wherein rotation of the knob directs the movement of the rod through the capsule, such that an audible and tactile response is generated as the indicator engages the channel.

2. A device as in claim 1, wherein the capsule is disposable.

3. A device as in claim 1, wherein the means to provide controlled engagement comprise a set screw.

4. A device as in claim 1, wherein the means to provide controlled engagement comprise threads in the end cap.

5. A device as in claim 1, wherein the indicator comprises a ball plunger.

6. A device as in claim 2, wherein the capsule is made of a translucent, plastic material.

* * * * *